United States Patent
Hepp et al.

(10) Patent No.: US 10,345,129 B2
(45) Date of Patent: Jul. 9, 2019

(54) SENSOR WITH METAL SUBSTRATE AND DIELECTRIC MEMBRANE FOR DETERMINING A PROCESS VARIABLE OF A MEDIUM

(71) Applicant: Innovative Sensor Technology IST AG, Wattwil (CH)

(72) Inventors: Christoph Hepp, Wil (CH); Thomas Schonstein, Bilten (CH); Florian Krogmann, Wil (CH)

(73) Assignee: INNOVATIVE SENSOR TECHNOLOGY IST AG, Ebnat-Kappel (CH)

(*) Notice: Subject to any disclaimer, the term of this patent is extended or adjusted under 35 U.S.C. 154(b) by 207 days.

(21) Appl. No.: 14/652,632

(22) PCT Filed: Dec. 17, 2013

(86) PCT No.: PCT/EP2013/076827
§ 371 (c)(1),
(2) Date: Jun. 16, 2015

(87) PCT Pub. No.: WO2014/102086
PCT Pub. Date: Jul. 3, 2014

(65) Prior Publication Data
US 2016/0195419 A1  Jul. 7, 2016

(30) Foreign Application Priority Data

Dec. 21, 2012 (DE) .......................... 10 2012 112 845
Feb. 13, 2013 (DE) .......................... 10 2013 101 403

(51) Int. Cl.
G01F 1/684  (2006.01)
G01F 1/692  (2006.01)
G01F 1/688  (2006.01)

(52) U.S. Cl.
CPC ............ *G01F 1/688* (2013.01); *G01F 1/6845* (2013.01); *G01F 1/692* (2013.01)

(58) Field of Classification Search
None
See application file for complete search history.

(56) References Cited

U.S. PATENT DOCUMENTS 4,539,059 A     9/1985  Burger
4,542,650 A *   9/1985  Renken ................ G01F 1/6965
                                                                     338/319

(Continued)

FOREIGN PATENT DOCUMENTS

DE    3231345 A1    3/1984
DE    3606852 A1    9/1987

(Continued)

OTHER PUBLICATIONS

German Search Report, German Patent Office, Munich, dated Aug. 30, 2013.

(Continued)

*Primary Examiner* — Daniel J Colilla
(74) *Attorney, Agent, or Firm* — Bacon&Thomas, PLLC

(57) ABSTRACT

A sensor for determining at least one process variable of a medium, comprising: a metallic substrate which has a recess at least in a first area; a first dielectric layer which is arranged on the metallic substrate at least in the first area, wherein the first dielectric layer forms a membrane; at least one heating structure which is arranged on the first dielectric layer formed as a membrane in the first area, wherein the heating structure heats the medium; at least one temperature sensor element assigned to the first area, which temperature sensor element is arranged so as to be spaced apart from the heating structure on the first dielectric layer and detects the temperature of the medium heated on the heating structure; and at least one protective layer which covers at least the at least one heating structure and the at least one temperature sensor element.

15 Claims, 3 Drawing Sheets

(56) References Cited

U.S. PATENT DOCUMENTS

| | | | | |
|---|---|---|---|---|
| 5,291,781 | A | * | 3/1994 | Nagata ............... G01F 1/6845 |
| | | | | 73/204.11 |
| 5,423,212 | A | | 6/1995 | Manaka |
| 6,240,777 | B1 | | 6/2001 | Treutler |
| 6,712,987 | B2 | | 3/2004 | Wienand |
| 7,040,160 | B2 | | 5/2006 | Artmann |
| 2004/0090305 | A1 | | 5/2004 | Taguchi |
| 2006/0053878 | A1 | | 3/2006 | Ikeda |
| 2011/0107832 | A1 | * | 5/2011 | Sakuma ............... G01F 1/6842 |
| | | | | 73/204.26 |
| 2012/0247813 | A1 | * | 10/2012 | Ueda ............... H01L 23/49816 |
| | | | | 174/251 |

FOREIGN PATENT DOCUMENTS

| | | | |
|---|---|---|---|
| DE | 19744228 | C1 | 11/1998 |
| DE | 19856844 | A1 | 12/1999 |
| DE | 19941420 | A1 | 4/2000 |
| DE | 10058009 | A1 | 6/2002 |
| EP | 0235357 | A3 | 9/1987 |
| EP | 2348292 | A1 | 7/2011 |
| JP | 62102549 | A * | 5/1987 |

OTHER PUBLICATIONS

International Search Report, EPO, The Netherlands, dated Jun. 10, 2014.
English Translation of the International Preliminary Report on Patentability, WIPO, Geneva, CH, dated Jul. 2, 2015.

* cited by examiner

SENSOR WITH METAL SUBSTRATE AND DIELECTRIC MEMBRANE FOR DETERMINING A PROCESS VARIABLE OF A MEDIUM

TECHNICAL FIELD

The invention relates to a sensor which is used to determine at least one process variable of a medium. The process variable is, for example, the flow rate of a medium, the concentration of a specific gas in a mixture of gases or the thermal properties of a gas.

SUMMARY OF THE INVENTION

Thermal flow sensors, in which at least one heating element and at least one temperature sensor element is mounted on a substrate, are already known from the prior art. These thermal flow sensors are typically manufactured on ceramic, glass or silicon substrates.

It is also known from the prior art that the heating element must be thermally insulated from the temperature sensor element to a good degree, so as to allow sensitive, rapid and accurate measurement of the flowing medium. In order to implement this thermal insulation, the thermal mass is kept as low as possible in the flow-sensitive layer, namely in the area of the heating element and the temperature sensor element. To this end, membranes are implemented in this area, so as to reduce the bulk or substrate mass and thus, the thermal mass as well. However, the so-designed flow sensors have the disadvantage that relatively thick substrates must be used in order to ensure the mechanical stability of the entire sensor. However, after the introduction of these flow sensors in the designated application, this leads to unfavorable turbulences which in turn lead to imprecise or even totally incorrect readings.

BACKGROUND DISCUSSION

Thus, the object of the invention is to propose a sensor that generates the least possible turbulence when introduced in the site of application and that has a high mechanical stability, and also a method for manufacturing such a sensor.

This object is achieved by a sensor and a method.

In terms of the sensor, the object is achieved according to the invention by the fact that the sensor for determining at least one process variable of a medium comprises at least:
- a metallic substrate that has a recess at least in a first region; and
- a first dielectric layer that is arranged on the metallic substrate at least in the first region, wherein the first dielectric layer forms a membrane; and
- at least one heating structure that is arranged in the first region on the first dielectric layer formed as a membrane, wherein the heating structure heats the medium; and
- at least one temperature sensor element, which is associated with the first region, arranged on the first dielectric layer at a distance from the heating structure and detects the temperature of the medium heated at the heating structure; and
- at least one protective layer that covers at least the at least one heating structure and the at least one temperature sensor element.

By the use of a metallic substrate, which acts as a support and can be designed very thin, preferably with a thickness in the range of 50-250 microns (micrometers), but more preferably a thickness less than 200 microns, lower influence on the surroundings, for example, vortex formation, can be achieved by the reduction of the overall height of the sensor when it is being introduced in the designated site of application, so as to obtain a more precise or more accurate measurement result using the sensor. For example, if it is a flow sensor, it can be used in a flow channel without causing substantial turbulence. In addition to having the least influence on the surroundings, it is also desirable to obtain a fast and sensitive sensor, in particular, also in case of a flow sensor. This requires, among others, a thermal insulation of the heating structure from the temperature sensor element and a reduction in thermal mass. In order to reduce the thermal mass, the sensitive structures, namely the at least one heating structure and preferably also the at least one temperature sensor element are formed on a membrane.

To this end, the metallic substrate is typically structured by means of industrial grade etching in such a manner that it comprises a recess by means of which the first dielectric layer forms a membrane.

In the context of this invention, the area above the recess introduced in the metallic substrate is essentially considered to be the first region, wherein the first region relates, in particular, to the membrane and the layers and/or structures that are arranged above the membrane.

Furthermore, in the context of this invention, association with the first region refers to the fact that the respective element may be located within or partly within or outside this region, but in the event that an element is arranged only partially inside or outside the first region, this element interacts with at least one element, which is formed within the first region, via the medium.

According to the invention, a metal is used as the substrate, so as to achieve the reduction of the overall height of the sensor, since metals offer the advantage that they have a high mechanical stability even at very low strengths or thicknesses and are also suitable for use in industrial etching processes for their structuring. Furthermore, metallic substrates may be coated with materials that are not affected by the process for structuring the metallic substrate, wherein the materials applied as a coating on the metallic substrate may in turn be provided with functional metallic structures. Compared to the thermal flow sensors known from the prior art, the use of a metal substrate offers the advantage that metal allows structuring as opposed to ceramic substrates.

A first dielectric layer is deposited on the metallic substrate to prevent an electrical connection between the at least one heating structure and the at least one temperature sensor element. In principle, a variety of materials, such as polyimide, parylene, other plastic layers, metal oxides, silicon oxide, silicon nitride, silicon carbide, glass, etc. can be used as a dielectric layer.

An advantageous embodiment of the sensor proposes that the first dielectric layer has a lower thermal conductivity than the metal substrate. In this way, thermal coupling can be achieved between the dielectric layer and the heating structure formed on the first dielectric layer, which in turn leads to better thermal coupling to the medium and the overlying layers.

Another advantageous embodiment of the sensor proposes that the protective layer is formed either as a second dielectric layer or as a composite layer, wherein the composite layer comprises at least one second dielectric layer and a third, preferably dielectric layer. In particular, the composite layer is designed such that the second dielectric layer covers the at least one heating structure and the at least one temperature sensor element and that the third, preferably dielectric layer at least partially covers the second dielectric layer. The essentially flat layer of the at least one heating structure and the at least one temperature sensor element allows particularly cost-effective implementation of the sensors and use of the standard processes, which are being integrated in semiconductor technology and have already been established in micromechanics.

Alternatively, the composite layer is designed such that the second dielectric layer covers at least the lateral regions of the at least one heating structure and the surfaces of the at least one heating structure and the at least one temperature sensor element are covered by the third, preferably dielectric layer. Particularly preferred is the fact that the thermal conductivity of the third, preferably dielectric layer is better than that of the first and/or second dielectric layer. The selective layer structure allows a particularly good heat transfer between the heating structure and the medium, and also between the temperature sensor element and the medium.

Another alternative embodiment proposes that the first dielectric layer has a plurality of first sections, and wherein the at least one heating structure and the at least one temperature sensor element are arranged on different sections of the plurality of first sections. In particular, the first dielectric layer is divided into a maximum of five first sections. By the arrangement of the at least one heating structure and the at least one temperature sensor element on different sections, they advantageously allow for even better thermal insulation and thus, a particularly favorable response behavior of the sensor can be achieved.

Another advantageous embodiment proposes that the protective layer has a plurality of second sections. In particular, the number of the second sections of the protective layer corresponds to the number of first sections of the first dielectric layer.

According to another embodiment of the sensor according to the invention, the coefficient of thermal expansion of the first dielectric layer is selected such that a tensile stress acts on the membrane. By the tensile stress acting on the membrane, buckling of the membrane can be prevented, which in turn ensures that a very smooth membrane surface is formed.

According to another embodiment of the sensor according to the invention, the coefficient of thermal expansion of the second dielectric layer is in the range of the coefficient of thermal expansion of the first dielectric layer, in particular, the difference between the coefficients of thermal expansion is less than 20%, preferably less than 10%.

A last embodiment of the sensor according to the invention proposes that the first dielectric layer and the third, preferably dielectric layer comprise polyimide, Kapton and/or parylene, and/or the at least one heating structure and the at least one temperature sensor element comprise platinum or nickel or a nickel compound.

With regard to the method, the object is achieved by one used to manufacture a sensor as it is described in at least one of the preceding embodiments, wherein the sensor is held together in a composite comprising a plurality of sensors during the manufacturing process, for which the metallic substrate of the sensors is connected with the metallic substrate of the neighboring sensor using at least one bar, and wherein the at least one bar is destroyed to separate the sensor and remove it from the composite.

An advantageous embodiment of the method proposes that the at least one path is manufactured by an etching process using a masking layer.

BRIEF DESCRIPTION OF THE DRAWINGS

The invention is further illustrated referring to the following drawings. Illustrated are.

DETAILED DISCUSSION IN CONJUNTION WITH THE DRAWINGS

Figure 1:
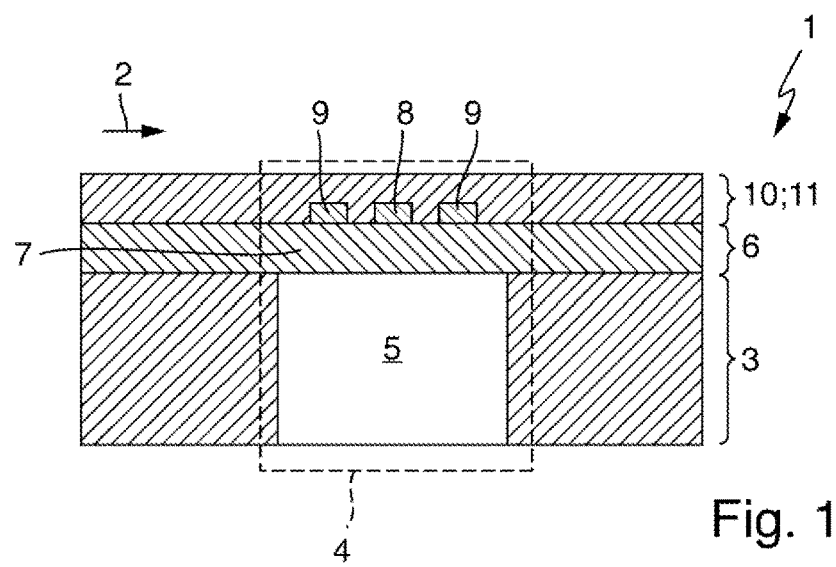
FIG. 1 which shows a cross-section of an embodiment of the sensor according to the invention, FIG. 2 which shows a cross-section of an advantageous embodiment of the sensor according to the invention.

FIG. 1 shows a cross-section of a first embodiment of the sensor 1 according to the invention. Here, the sensor 1 comprises a metallic substrate 3 made of stainless steel. On this metallic substrate 3, a first dielectric layer 6 that essentially comprises polyimide is applied. Using industrial grade production processes, in particular etching, a recess 5 is introduced in the metallic substrate 3. By the introduction of the recess 5 in the metallic substrate 3, the first dielectric layer 6 forms a membrane 7. The recess 5 and the first dielectric layer 6 that is above the recess 5 form a first region 4. Within the first region 4, a heating structure 8 that is formed on the first dielectric layer 6 is arranged.

In addition to the heating structure 8, at least one temperature sensor element 9 is applied on the first dielectric layer 6; two temperature sensor elements 9 are implemented in the embodiment shown in FIG. 1. These temperature sensor elements 9 are arranged at a distance from the heating structure 8, preferably the temperature sensor elements 9 are arranged within the first region 4.

However, it is also conceivable that at least one temperature sensor element 9 is also arranged only partially inside or outside the first region 4. In the case that a temperature sensor element 9 is arranged only partially within or outside of the first region 4, it can be assigned to the first region 4 in terms of the function such that an interaction or relationship exists between the heating structure 8 arranged within the first region 4 and the temperature sensor element 9. Thus, for example, the temperature of a medium 2, which is heated by the heating structure 8 arranged within the first region 4, can be detected by means of the temperature sensor element 9 arranged either partially within or outside the first region 4.

Both the heating structure 8 and the temperature sensor elements 9 are made of platinum. In order to prevent electrical coupling between the heating structure 8 and the temperature sensor elements 9 via the medium 2, at least one protective layer 10 that covers both the heating structure 8 and the two temperature sensor elements 9 is provided. In the embodiment of the sensor 1 according to the invention and shown in FIG. 1, the protective layer comprises only a second, preferably dielectric layer 11 that is applied evenly.

Alternatively, the heating structure can be made of a material having a low temperature coefficient of resistance (TCR), such as nickel chromium or nickel chromium with other additives for the targeted setting of the TCR. Moreover, the heating structure 8 and the temperature sensor elements 9 can be made of any metal or metal compound having a TCR, for example, tantalum or nickel.

Furthermore, the material of the first dielectric layer 6 is chosen such that a tensile stress acts on the membrane 7 due to the coefficient of thermal expansion, at least after complete processing or manufacture of the sensor 1. This offers the advantage that a non-curved shape of the membrane 7, which ensures that the membrane 7 forms a smooth surface, is achieved.

Figure 2:
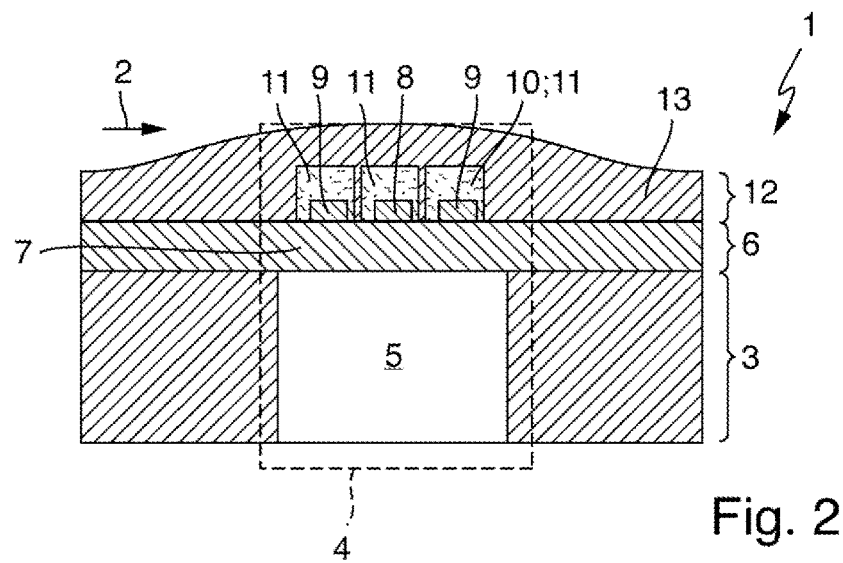
Figure 3:
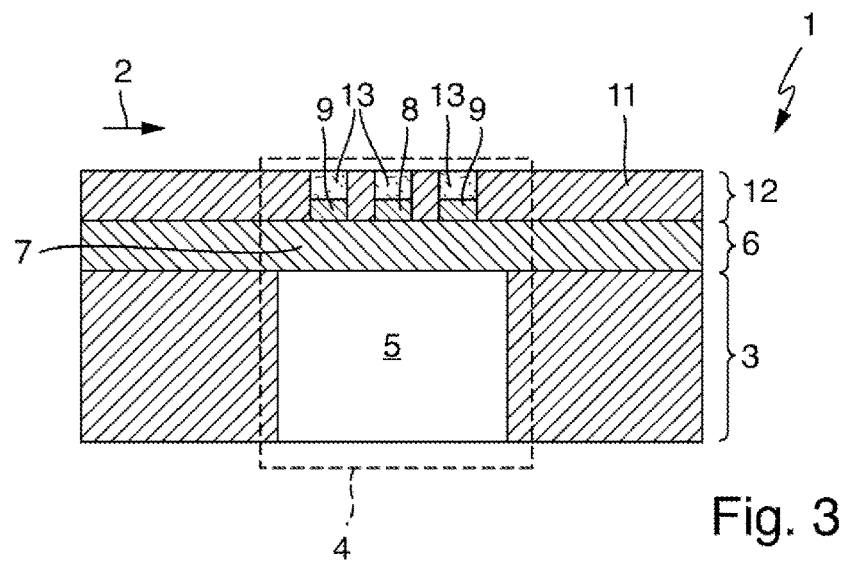
FIG. 3 which shows a cross-section of another advantageous embodiment of the sensor according to the invention.

FIGS. 2 and 3 show cross-sections of other advantageous embodiments of the sensor 1 according to the invention, wherein the embodiment substantially corresponds to the sensor 1 shown in FIG. 1; only the protective layer 10 is formed differently in an advantageous manner. In FIG. 2, the at least one protective layer 10 is designed as a composite layer 11, 13, which comprises a second and a third layer 11, 13, wherein both the second and third layers 11, 13 preferably constitute dielectric layers as well. The embodiment shown in FIG. 2 has the advantage that the use of a composite layer 11, 13, which consists of at least a second and a third layer 11, 13, allows the adjustment of the composite layer according to the medium 2 or the aggressiveness of the medium 2 and the protection of the heating structure 8 and/or the temperature sensor element 9 specifically against each medium 2.

It has also proven advantageous that the material of the second layer 11 is chosen in such a way that the coefficient of thermal expansion of the second, preferably dielectric layer 11 is in the range of the coefficient of thermal expansion of the first dielectric layer 6.

The second layer 11, which is preferably a dielectric layer, is a metal oxide layer that covers the heating structure 8 and the temperature sensor element 9 at least locally. This second layer 11 is, in turn, covered with an evenly applied third layer 13, preferably also a dielectric layer, e.g. a polymer, such as parylene.

In this way, as mentioned already, the heating structure 8 and/or the temperature sensor element 9 can be protected against specific media, especially aggressive media 2. Aggressive media are, e.g. acidic or basic media or condensing air moisture.

Although the heating structure 8 and/or the temperature sensor element 9 can be protected from specific media 2 by using a composite layer 11, 13 with at least two layers, this method has the disadvantage that a lower thermal coupling between the heating structure 8 and the medium 2 or the temperature sensor element 9 and the medium 2 arises, thus making the implementation of a fast response time of the sensor 1 difficult.

For this reason, a further alternative embodiment of the sensor 1 according to the invention is shown in FIG. 3, in which the composite layer is designed such that the second, preferably dielectric layer 11 is applied evenly on the first dielectric layer 6, wherein the second layer 11 covers at least the lateral regions or side walls of the at least one heating structure 8 and/or the temperature sensor element 9 and the surfaces, namely the side or surface facing the medium 2 of the at least one heating structure 8 and the at least one temperature sensor element 9 are covered by a third, preferably dielectric layer 13. Here, the thermal conductivity of the third layer 13 is, in particular, better than that of the first and/or second layer 6, 11. In this way, an improved thermal coupling between the medium 2 and the heating structure 8 as well as between the temperature sensor element 9 and the medium 2 can be realized by means of the third layer 13, so as to achieve the fastest possible response time of the sensor 1.

Figure 4:
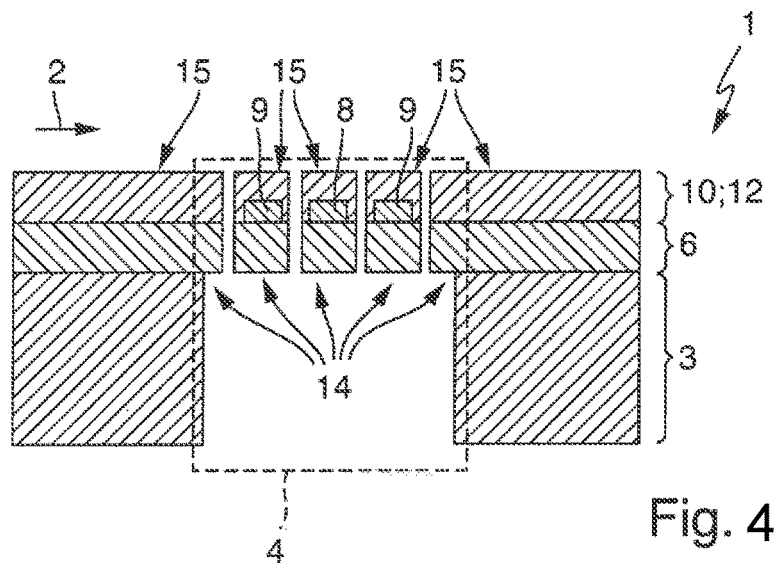
FIG. 4 which shows a cross-section of a specially advantageous embodiment of the sensor according to the invention.

FIG. 4 shows a cross-section of a particularly advantageous embodiment of the sensor 1 according to the invention, wherein the design of the sensor 1 in terms of the layer structure corresponds to at least one of the figures shown above. However, the first dielectric layer 6 has a plurality of, at most five, first sections 14, so that each heating structure 8 and each temperature sensor element 9 is arranged on a separate section 14, so as to achieve even better decoupling, in particular decoupling of the thermal conduction, between the heating structures 8 and the temperature sensor elements 9.

Furthermore, the protective layer 10, which in turn, as already mentioned, can be an individually formed layer 11 or a composite layer 12, has a plurality of second sections 15, wherein the number of second sections 15 preferably corresponds to the number of the first sections 14 of the first dielectric layer 6, so as to avoid unwanted heat transfer via the protective layer (i.e. either the individually formed layer 11 or the composite layer 12).

Figure 5A:
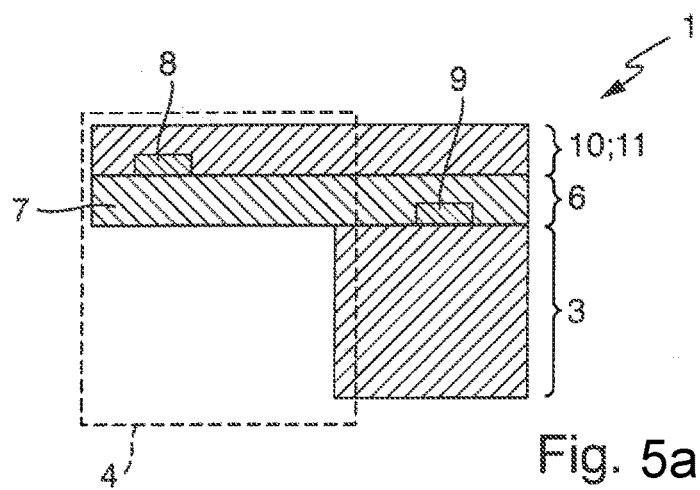
FIGS. 5a and 5b which show an alternative embodiment of the sensor according to the invention.
Figure 5B:
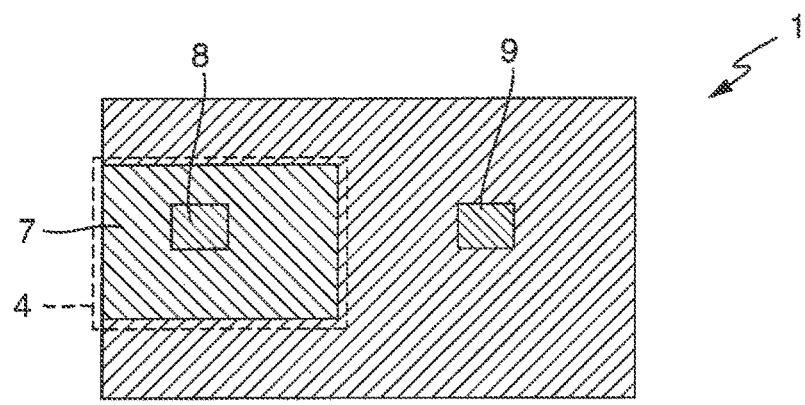

FIG. 5 shows an alternative embodiment of the sensor 1 according to the invention, wherein FIG. 5 a) shows a side view and FIG. 5 b) shows a plan view of the sensor 1. Here, the recess 5 is introduced in the edge region of the metallic substrate 3 of the sensor 1.

On the metallic substrate 3, which is made of stainless steel, a dielectric layer 6 is applied which forms a membrane 7 in the first region 4 of the recess 5, wherein the first region 4 in turn relates to the membrane 7 as well as the layers and/or related elements above the membrane 7. Within this first region 4, the at least one heating structure 8 for heating the medium 2 is formed.

The temperature sensor element 9 is arranged outside the first region 4, but allows association with the first region 4 to the extent that it interacts with elements and/or structures that are arranged within the first region 4 in such a way that a medium 2, in particular a flowing medium 2 is heated at the heating structure 8 within the first region 4 and the temperature of the medium 2 is detected at the temperature sensor element 9 outside the first region 4.

Furthermore, a protective layer 10 that covers at least the at least one heating structure 8 and the at least one temperature sensor element 9 is provided. This protective layer 10 is designed in the form of a single second layer 11 in the embodiment illustrated in FIG. 5. However, it is also conceivable, in particular, for specific applications of the sensor 1, that the protective layer 10 is designed as a composite layer 12, which comprises at least two additional layers, wherein the two additional layers are preferably designed as dielectric layers.

Figure 6:
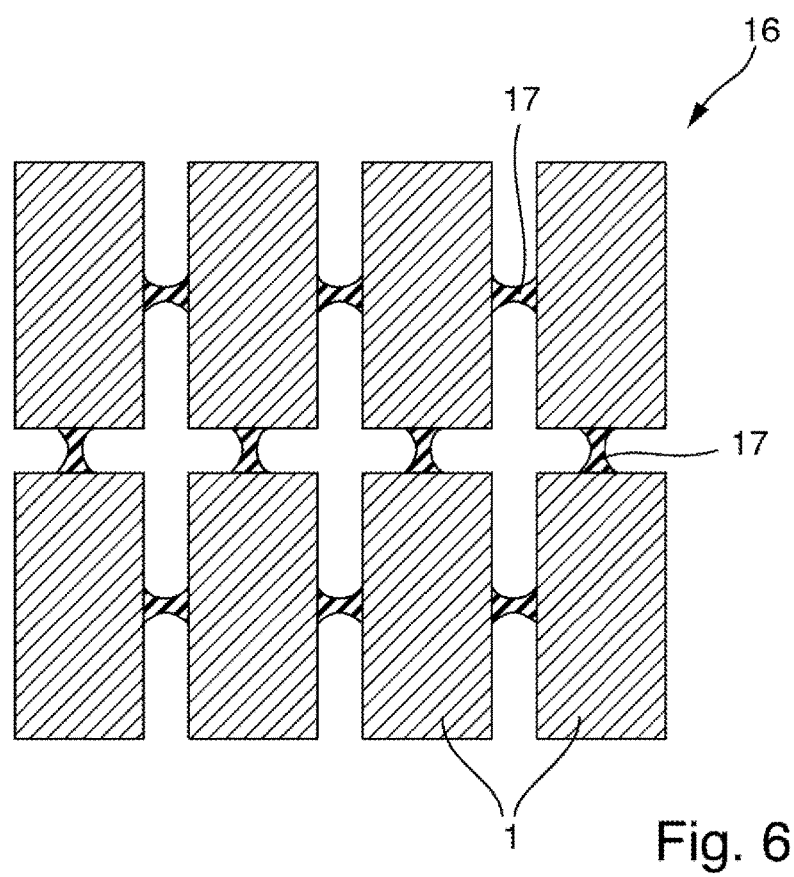
FIG. 6 which is a schematic representation of a composite, which comprises a plurality of sensors for producing a sensor according to the invention.

FIG. 6 shows a schematic representation of a composite 16, which comprises a plurality of sensors 1 for producing a sensor 1 according to the invention. In order to more easily process or manufacture a miniaturized sensor 1 as it is described above, a plurality of sensors 1 are held together in a composite 16 during the manufacturing process, for which the metallic substrate 3 of the sensors 1 is connected with the metallic substrate 3 of the neighboring sensor 1 using at least one bar 17, and wherein the bar 17 adjoining the sensor 1 to be separated is destroyed and the sensor 1 is removed from the composite 16.

It is also provided that the at least one bar is made by an etching process using a

The invention claimed is:

1. A sensor for determining at least one process variable of a medium, comprising at least:
   a metallic substrate that has a recess in at least a first region; and a first dielectric layer applied on said metallic substrate and forming a membrane, wherein the membrane is formed exclusively by the first dielectric layer;

at least one heating structure that is arranged in said at least one first region on said first dielectric layer formed as a membrane, said at least one heating structure heats the medium;

at least one temperature sensor element arranged outside said first region on said first dielectric layer or on said metallic substrate at a distance from said at least one heating structure and detects the temperature of the medium outside said first region heated at said by least one heating structure; and at least one protective layer that covers at least said at least one heating structure and said at least one temperature sensor element, wherein:

said metallic substrate has a thickness in the range of 50 microns to 250 microns.

2. The sensor according to claim 1, wherein:
said first dielectric layer has a lower thermal conductivity than said metallic substrate.

3. The sensor according to claim 1, wherein:
said protective layer is formed as a composite layer; and
said composite layer comprises at least one second dielectric layer and a third, preferably dielectric layer.

4. The sensor according to claim 3, wherein:
said composite layer is designed such that said second dielectric layer at least covers said at least one heating structure and said at least one temperature sensor element; and
said third, preferably dielectric layer at least partially covers said second dielectric layer.

5. The sensor according to claim 3, wherein:
said composite layer is designed such that said second dielectric layer covers at least the lateral regions of said at least one heating structure and/or said temperature sensor element and the surfaces of said at least one heating structure; and
said at least one temperature sensor element are covered by said third, preferably dielectric layer.

6. The sensor according to claim 5, wherein:
the thermal conductivity of said third, preferably dielectric layer is better than that of said first and/or said second dielectric layer.

7. The sensor according to claim 1, wherein:
said first dielectric layer has a plurality of first sections; and
said at least one heating structure and said at least one temperature sensor element are arranged on different sections of said plurality of first sections.

8. The sensor according to claim 7, wherein:
said first dielectric layer is divided into a maximum of five first sections.

9. The sensor according to claim 7, wherein:
said protective layer comprises a plurality of second sections.

10. The sensor according to claim 9, wherein:
the number of said second sections of said protective layer corresponds to the number of first sections of said first dielectric layer.

11. The sensor according to claim 1, wherein:
the coefficient of thermal expansion of said first dielectric layer is selected such that a tensile stress acts on said membrane.

12. The sensor according to claim 3, wherein:
the coefficient of thermal expansion of said second dielectric layer is in the range of the coefficient of thermal expansion of said first dielectric layer.

13. The sensor according to claim 3, wherein:
said first dielectric layer and said third, preferably dielectric layer comprises polyimide, and/or said at least one heating structure and said at least one temperature sensor element comprise platinum or nickel or a nickel compound.

14. A method of manufacturing a sensor for determining at least one process variable of a medium, comprising at least:

a metallic substrate that has a recess in at least a first region; and a first dielectric layer applied on said metallic substrate and forming a membrane arranged over the recess in said first region, wherein:

the membrane is formed exclusively by said first dieletric layer;

at least one heating structure that is arranged in said at least one first region on said first dielectric layer formed as a membrane, said at least one heating structure heats the medium;

at least one temperature sensor element arranged outside said first region on said first dielectric layer or on said metallic substrate at a distance from said at least one heating structure and detects the temperature of the medium outside said first region heated at said by least one heating structure;

at least one protective layer that covers at least said at least one heating structure and said at least one temperature sensor element, the sensor is held together in a composite comprising a plurality of sensors during the manufacturing process, for which the metallic substrate of the sensors is connected with the metallic substrate of the neighboring sensor using at least one bar, and the metallic substrate has a thickness in the range of 50 microns to 250 microns; and the bar is destroyed to separate the sensor and remove it from the composite.

15. The method according to claim 14, wherein:
the at least one bar is produced by an etching process using a masking layer.

* * * * *